(No Model.) 2 Sheets—Sheet 1.

C. E. LINDQUIST.
EGG TESTER.

No. 558,290. Patented Apr. 14, 1896.

Witnesses
Hayett Moffat
A. M. Eckman

Inventor:
Carl E. Lindquist, (No Model.)

C. E. LINDQUIST.
EGG TESTER.

No. 558,290.

2 Sheets—Sheet 2.

Patented Apr. 14, 1896.

Witnesses

Inventor
Carl E. Lindquist.

UNITED STATES PATENT OFFICE.

CARL EMIL LINDQUIST, OF HENDRUM, MINNESOTA.

EGG-TESTER.

SPECIFICATION forming part of Letters Patent No. 558,290, dated April 14, 1896.

Application filed May 17, 1895. Serial No. 549,720. (No model.)

*To all whom it may concern:*

Be it known that I, CARL EMIL LINDQUIST, a citizen of the United States, residing at Hendrum, in the county of Norman and State of Minnesota, have invented certain new and useful Improvements in Egg Testers and Packers; and I do hereby declare the following to be a full, clear, and exact description of the same, reference being had to the accompanying drawings, in which—

Figure 1:
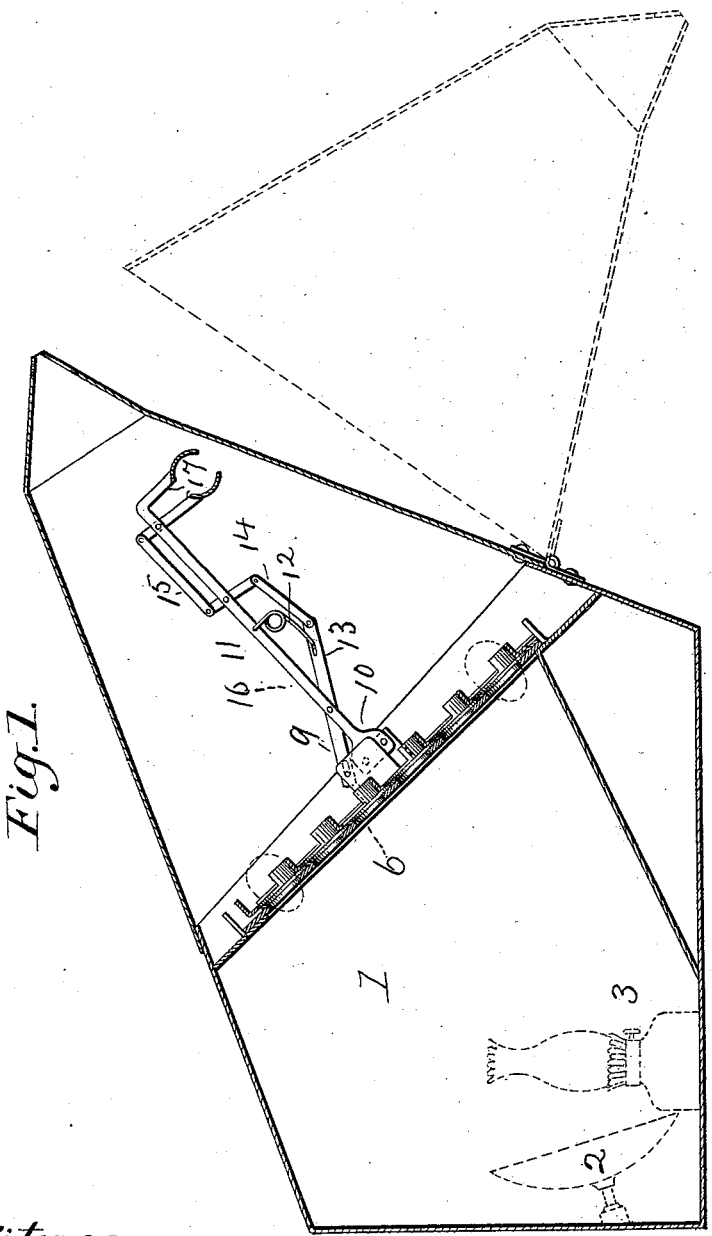
Figure 2:
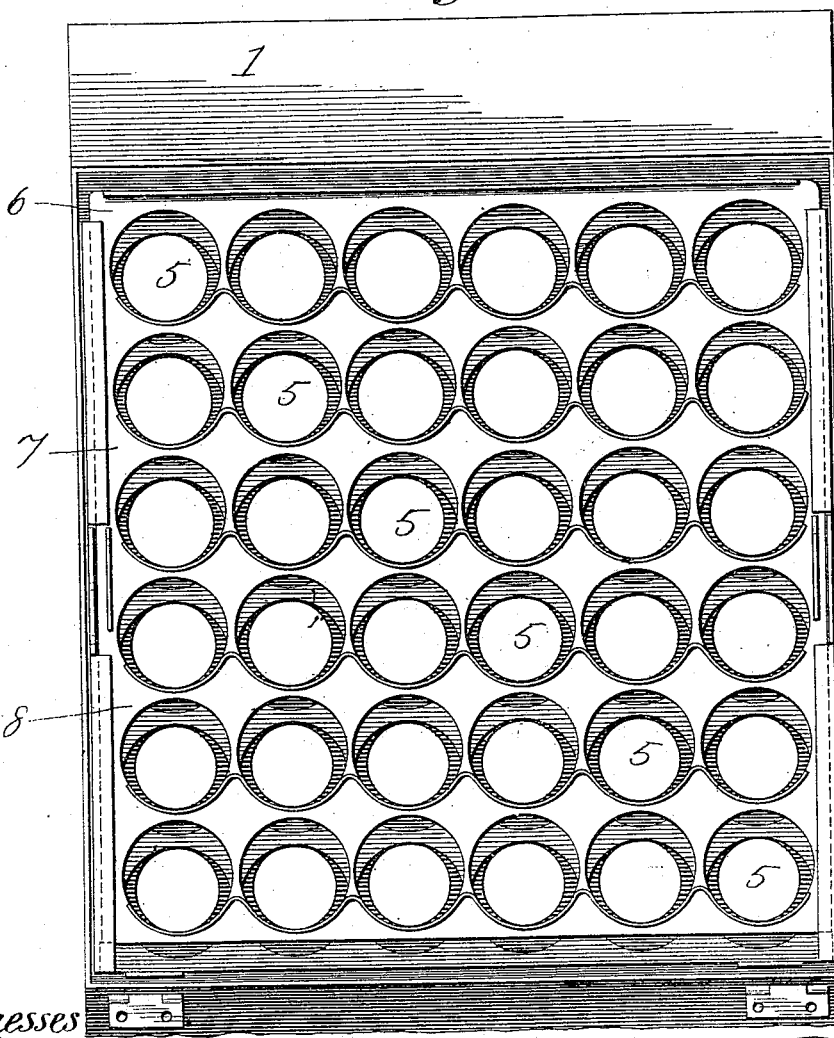

Figure 1 is a vertical longitudinal sectional view of an egg tester and packer embodying improvements of my invention, the same being shown in the closed position in full lines, the cover in this figure being also shown in the open position in dotted lines. Fig. 2 is a plan view of one of the packers and a portion of the inclosure and cover, showing a plan view of the filler.

It has been common to "candle" eggs or to submit them to a test of light in a dark room. This process is, however, objectionable for several reasons, as it necessitates the exclusion of light and fresh air from the room and renders the labor attending the testing and packing laborious and unhealthful to the operators.

Among the objects of my invention is to afford ample light and the advantages of ventilation in the room where the operator is engaged in testing and packing the eggs, and at the same time subject a number of eggs at a time to the testing process, whereby the affected eggs may be readily separated from the sound ones, sound eggs substituted for the defective ones, and the testing tray or packer operated by a hand-lever to discharge the eggs from the packer into the filler, which is afterward placed in any desired numbers in a shipping-case and forwarded to its place of destination, thereby saving great labor and insuring the soundness of eggs shipped to retailers and consumers.

Referring by numerals to the accompanying drawings, 1 is the receptacle, in the lower rear portion of the interior of which is placed a reflector 2 and a lamp 3, the latter of which, when lighted, is designed to furnish the light by means of which the eggs, when in place in the filler and resting in the receptacles 5 therein, may be tested by subjecting them to the action of the light behind them to discover when they are specked or free from specks, so that the unsound or affected eggs may be removed from the tester and only sound eggs be left to be shifted into the packer to be thereafter incased for shipment to the retailers and consumers.

The filler 6 comprises two longitudinally-adjustable sections 7 and 8, which at their inner or adjacent ends are connected to the lower ends of the arms 9 and 10 of a compound spring-controlled lever 11, the spring 12 normally pressing the jointed arms 13, 14, and 15 outwardly or away from the main stem 16 of the lever 11. At its upper end the lever 11 is provided with angularly-bent hand-pieces or compressor-arms 17, by which the lever may be operated by compressing the hand-pieces or arms 17 to expand the packer-sections, thereby releasing the eggs in their seats in the packer and depositing them in the receptacles or seats in the filler, which may be then removed and placed in position in the shipping-case. A second filler is then put in place and the eggs tested, as in the first instance, deposited in the filler, as in the first instance, the filler then removed and deposited in the shipping-case, and thus on until the requisite number of shipping-cases have been filled. When the hand-pressure on the compound lever is released, said lever normally springs back to place and throws the packer in position to be filled again and the eggs tested, as before. The cover is provided at its top with an opening or view-hole, through which the eggs are viewed when in place in the tester and packer. Said view-opening is provided with a hinged lid or door to close the view-opening when necessary.

Having thus described my invention, what I claim, and desire to secure by Letters Patent, is—

In an egg tester and packer to be used in combination with a filler provided with egg-receptacles, a dumping tray or packer, comprising two sliding sections provided with egg-receptacles, a lever-arm connected with one of said sliding sections and provided at its free end with a compressor-arm, a sectional lever connected with the other sliding section of the tray or packer, provided at its free end with a compressor-arm, fulcrumed through its center to the lever-arm and connected with the second section of the dumping tray or packer, and a spring connecting the lever-arm with a section of the sectional lever, substantially as specified.

CARL EMIL LINDQUIST.

Witnesses:
FAYETTE MOFFATT,
A. M. ECKMANN.